United States Patent [19]
Kohyama

[11] Patent Number: 5,122,838
[45] Date of Patent: Jun. 16, 1992

[54] IMAGE FORMING APPARATUS FOR DEVELOPING A LATENT IMAGE ON AN IMAGE CARRYING BODY WITH A ONE COMPONENT DEVELOPING AGENT AND SIMULTANEOUSLY REMOVING RESIDUAL DEVELOPING AGENT FROM THE IMAGE CARRYING BODY

[75] Inventor: Mitsuaki Kohyama, Higashikurume, Japan

[73] Assignee: Kabushiki Kaisha Toshiba, Kawasaki, Japan

[21] Appl. No.: 531,103

[22] Filed: May 31, 1990

[30] Foreign Application Priority Data

May 31, 1989 [JP] Japan .................. 1-138841

[51] Int. Cl.⁵ .................. G03G 15/06
[52] U.S. Cl. .................. 355/269; 355/270; 355/297; 346/160
[58] Field of Search ........... 355/264, 259, 269, 270, 355/297; 346/160

[56] References Cited

U.S. PATENT DOCUMENTS

| | | |
|---|---|---|
| 364,926 | 6/1887 | Hodgman et al. |
| 3,617,123 | 11/1971 | Emeyson ............ 355/270 |
| 3,646,866 | 3/1972 | Baltazzi et al. ........ 355/270 |
| 3,649,262 | 3/1972 | Cade et al. ........... 118/637 |
| 3,914,045 | 10/1975 | Namiki et al. ........ 355/270 |
| 4,396,275 | 8/1983 | Oka et al. ............ 355/270 |
| 4,609,280 | 9/1986 | Queener ............. 355/270 |
| 4,664,504 | 5/1987 | Oda et al. ............. 355/15 |
| 4,727,395 | 2/1988 | Oda et al. ............ 355/270 |
| 4,769,676 | 9/1988 | Mukai et al. ......... 355/270 |
| 4,800,147 | 1/1989 | Savage ............... 355/270 |
| 4,836,135 | 6/1989 | Kohyama et al. ..... 355/270 |
| 4,843,424 | 6/1989 | Oda et al. ............ 355/270 |
| 4,967,231 | 10/1990 | Hosoya et al. ....... 355/259 X |

FOREIGN PATENT DOCUMENTS 47-11538  6/1972  Japan .
63-241587 10/1988 Japan .

Primary Examiner—Benjamin R. Fuller
Assistant Examiner—Randy W. Gibson
Attorney, Agent, or Firm—Foley & Lardner

[57] ABSTRACT

A recording apparatus comprising an image carrying body, a device for forming an electrostatic latent image on the image carrying body, a developing and cleaning device adapted to press an elastic developing member, having a developing agent formed on the surface thereof, against the latent image, for sliding contact with a speed difference therebetween, to reverse-develop the latent image, and to remove developing agent remaining on the image carrying body, and a contact-transfer device for pressing a sheetlike material against the developing agent image on the image carrying body, to transfer the developing agent image to the sheetlike material. The developing agent on the elastic developing member is a one-component developing agent charged to the same polarity as the electrostatic latent image.

17 Claims, 3 Drawing Sheets

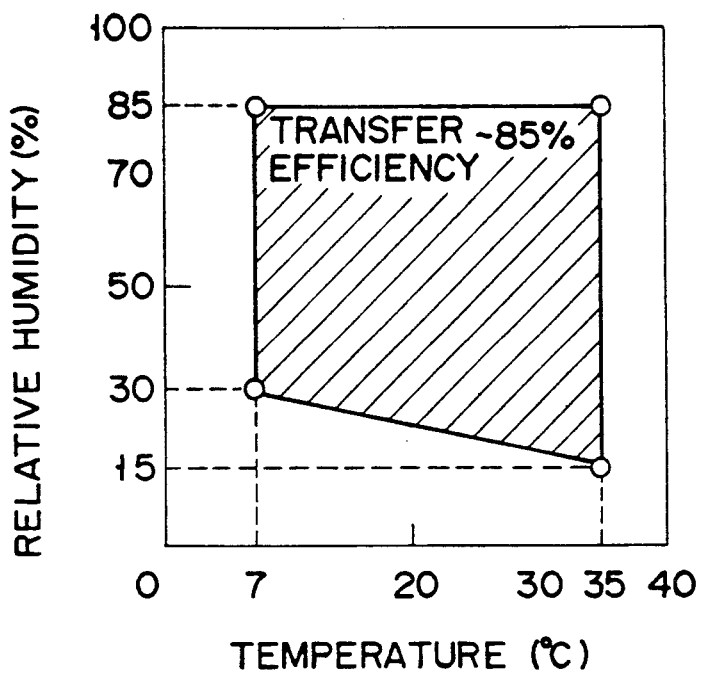
F I G. 3

IMAGE FORMING APPARATUS FOR DEVELOPING A LATENT IMAGE ON AN IMAGE CARRYING BODY WITH A ONE COMPONENT DEVELOPING AGENT AND SIMULTANEOUSLY REMOVING RESIDUAL DEVELOPING AGENT FROM THE IMAGE CARRYING BODY

BACKGROUND OF THE INVENTION

1. Field of the Invention

The present invention relates to a recording apparatus for developing an electrostatic latent image formed on an image carrying body, such as a photoreceptor, and recording the developed image on a transfer material such as paper.

2. Description of the Related Art

Conventional recording apparatuses of this type include electrophotographic devices electrostatic printers, etc. In the case of conventional apparatuses, an electrostatic latent image is formed on a photoreceptor, and a developing agent is then made to adhere electrostatically to the latent image, as a result of which a developing agent image is formed. Subsequently, the developing agent image is recorded by being transferred to paper. After image transfer, the electrostatic latent image and untransferred particles of the developing agent remain on the photoreceptor, the residual developing agent being removed by means of a cleaning device, and the latent image then removed by means of a de-electrifying device.

In recent times, there has been increasing demand for such recording apparatuses in more compact 25 form. In this connection, a method is disclosed in Published Unexamined Japanese Patent Application No. 47-11538, for example, whereby a recording apparatus is reduced in size through making use of a device which serves, as both a developing device and a cleaning device. According to this method, an electrostatic latent image is developed as a photoreceptor drum makes a first passage through the developing device, and a residual image remaining after transfer is cleaned off as the drum makes second passage therethrough.

However, because the cleaning step is effected by means of the photoreceptor drum making a second passage through the developing device, the recording speed is halved, and the recording area cannot be greater than the area of the whole peripheral surface of the drum. To obtain a greater recording area, therefore, the photoreceptor drum must inevitably be made relatively large in size, so that the apparatus cannot be satisfactorily reduced in size.

Disclosed in U.S. Pat. No. 3,649,262, on the other hand, is a method in which reduction of the recording speed is prevented by using a developing device which can remove the residual developing agent as it develops an electrostatic latent image.

According to this method, however, charging of the photoreceptor drum, formation of the electrostatic latent image, and developing are performed with the residual image left on the drum after the transfer process. In the charging process, therefore, the latent image and developing agent image remaining on the photoreceptor drum are unexpectedly charged, and next, image exposure is effected. Accordingly, uniform charging and satisfactory formation of the electrostatic latent image cannot be insured, and the residual image in the preceding process develops superposed on a so-called ghost image. Thus, the resulting image is not clear.

Such a phenomenon is liable to present itself particularly when the solid area of the image (in which the developing agent image spreads over a wide area) overlaps the residual image in the preceding process. Moreover, it sometimes is the case that a residual developing agent image itself, as well as the residual electrostatic latent image, remains as a residual image on account of insufficient cleaning, and sometimes may be transferred to the paper.

While it is preferable, from the point of view of reducing the size of a recording apparatuses, to employ, as the developing device, a one-component system using a one-component developing agent, this type of system, however, has the drawback of possessing a poor mechanical cleaning capability.

Thus, the conventional recording apparatuses cannot produce distinct images, and never permit reduction in size.

SUMMARY OF THE INVENTION

An object of the present invention is to provide a recording apparatus of reduced size and capable of producing a clear and distinct image.

According to an aspect of the present invention, there is provided a recording apparatus which comprises: an image carrying body; means for forming an electrostatic latent image on the image carrying body; developing and cleaning means adapted to press an elastic developing member, having a developing agent layer formed on the surface thereof, against the electrostatic latent image for sliding contact with a speed difference therebetween, thereby developing the latent image, and to remove developing agent remaining on the image carrying body; and transfer means for transferring the developing agent image on the image carrying body to a sheetlike material.

According to another aspect of the invention, there is provided a recording apparatus which comprises: an image carrying body; means for forming an electrostatic latent image on the image carrying body; developing and cleaning means adapted to press an elastic developing member, having a developing agent formed on the surface thereof and charged to the same polarity as the electrostatic latent image, against the latent image for sliding contact with a speed difference therebetween, thereby reverse-developing the latent image, and to remove developing agent remaining on &he image carrying body; and contact-type transfer means for pressing a sheetlike material against the developing agent image on the image carrying body, thereby transferring the developing agent image to the sheetlike material.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a diagram showing the range wherein satisfactory transfer efficiency is obtained by use of a transfer roller;

DETAILED DESCRIPTION OF THE PREFERRED EMBODIMENTS

A preferred embodiment of the present invention will now be described in detail, with reference to the accompanying drawings.

Figure 1:
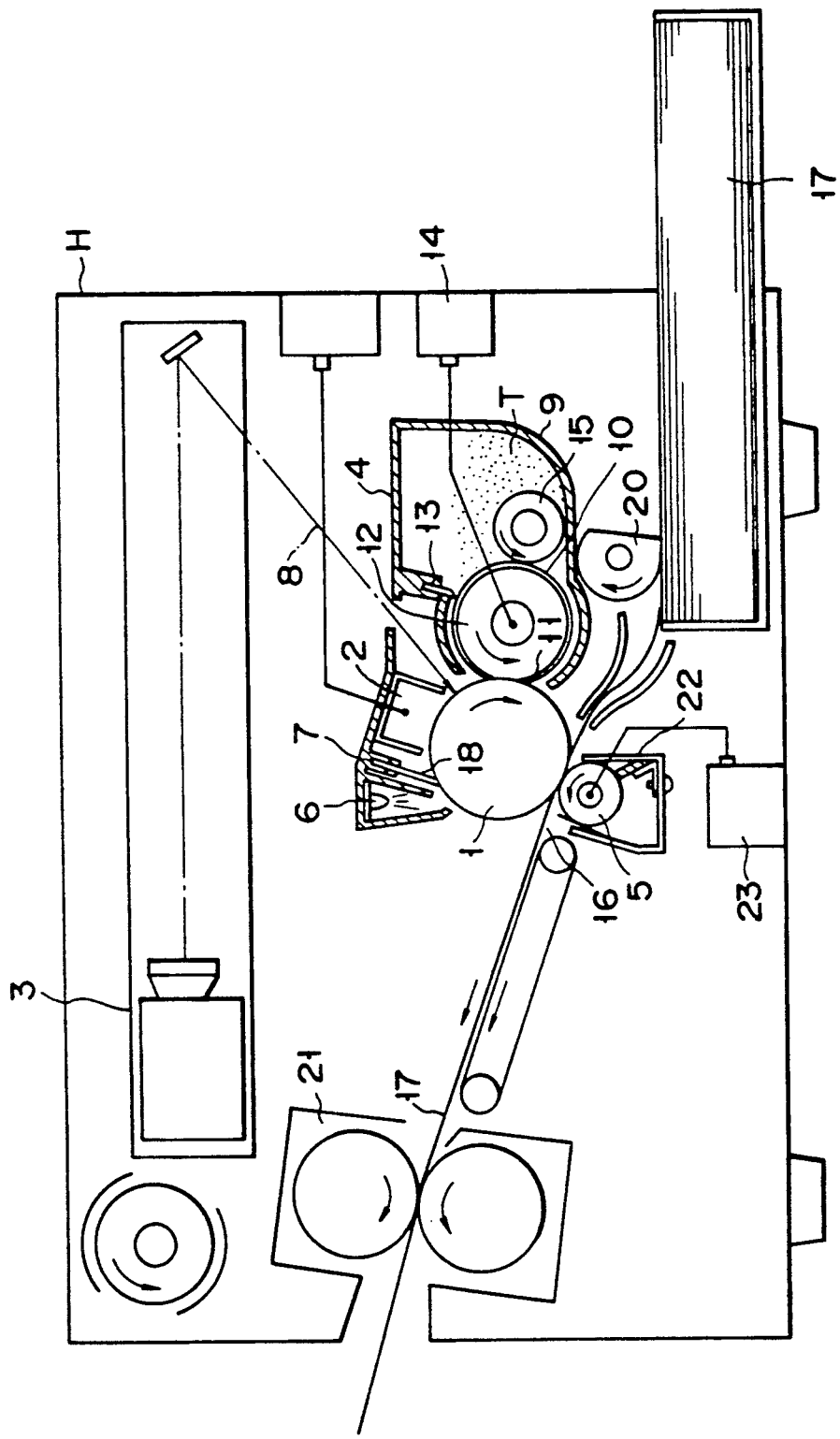
FIG. 1 is a sectional view of a recording apparatus according to an embodiment of the present invention.

FIG. 1 is a sectional view of a recording apparatus according to the preferred embodiment of the invention. As can be seen from this figure, a photoreceptor drum 1 is disposed substantially in the center of a housing H of the recording apparatus and rotatable in the direction indicated by arrow A. The photoreceptor drum 1 is formed of a photoconductive material, such as an organic photoconductor (OPC), and is surrounded by a charger 2, a laser device 3, a developing and cleaning device 4, a transfer roller 5, a discharge lamp 6, and a disordering device 7.

The charger 2, which is situated above the photoreceptor drum 1, charges the surface of the drum 1 substantially uniformly from $-500$ to 800 V.

The laser device 3 applies a laser beam 8 to the surface of the photoreceptor drum 1, in accordance with the image to be recorded, and thus forms the desired electrostatic image.

Figure 2:
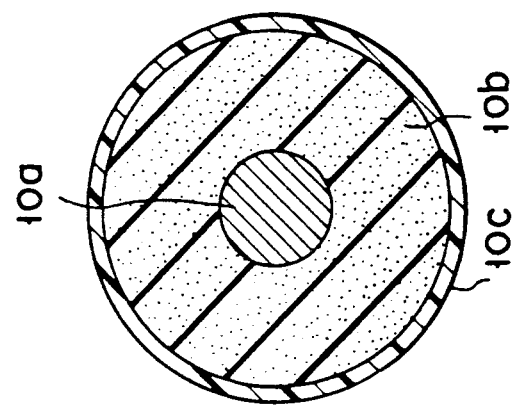
FIG. 2 is a sectional view of a developing roller included in the recording apparatus shown in FIG. 1.

The developing and cleaning device 4 is provided with a hopper 9 containing a so-called one-component developing agent T capable of being frictionally charged. A developing roller 10 is disposed in the hopper 9, and transports the developing agent T to the position where it faces the photoreceptor drum 1, and after image transfer, returns developing agent T remaining on the surface of the drum 1 to the hopper 9. As shown in FIG. 2, the developing roller 10 is composed of a metal shaft 10$a$, an elastic layer 10$b$ surrounding the shaft 10$a$, and a conductive surface layer 10$c$ formed on the surface of the layer 10$b$. The developing roller has elasticity as a whole. The elastic layer 10$b$ is formed of polyurethane foam, for example, while the material constituting the conductive surface layer 10$c$ is selected from among materials (listed later) suitable for friction charging the developing agent T and having the required elasticity and friction characteristics. The conductive surface layer 10$c$ may be formed by applying, for example, a mixture of polyurethane resin and 10 to 30% by weight of conductive carbon to the elastic layer 10$b$. The electric resistance required for the layer 10$c$ ranges from $10^2$ to $10^9$ $\Omega \cdot$ cm.

The developing roller 10 is in pressure-contact with an elastic blade 13 which serves to form the developing agent T as a thin layer on the surface of the roller 10. The blade 13 may be formed of phosphor bronze, polyurethane resin, or silicone resin. The developing agent T passing through the blade 13 is charged negatively or to the same polarity as the photoreceptor drum 1, thus forming one or two developing agent layers.

The developing roller 10 is connected with a bias power source 14, and is connected electrically with a surface layer 11. By virtue of this arrangement, a predetermined developing bias can be applied to the roller 10 at the time of development and cleaning. A sponge-like developing agent transportation roller 15, which is disposed in the hopper 9, serves to prevent cohesion of the developing agent T in the hopper and to transport the developing agent.

The transfer roller 5, which is situated substantially directly beneath the photoreceptor drum 1, faces the peripheral surface of the drum 1 across a paper transportation path 16. The roller 5 has the same construction as the developing roller 10, and the electric resistance of its conductive surface layer 10$c$ ranges from $10^5$ to $10^{10}$ $\Omega \cdot$ cm. A conducting part, made of a mixture of silicone resin and 30 to 40% by weight of conductive carbon, is formed at each end portion of the transfer roller 5, and a transfer voltage to be applied to the conductive surface layer 10$c$ passes therethrough. Thus, the transfer roller 5 applies a voltage of 800 to 1,800 V to the back surface of a sheet of transfer paper conveyed thereto, causing a toner to be electrostatically attracted to the front surface of the paper, and a toner image to be transferred from the photoreceptor drum 1 to the paper. This contact-type transfer means ensures reliable image transfer even in conditions of high humidity, so that the residual developing agent can be reduced to lower the cleaning load. Also, paper dust from the transfer paper can be removed and prevented from getting mixed with the developing agent.

The disordering device 7 is provided with a conductive elastic brush 18 whose tip end o the vicinity thereof is in sliding contact with the photoreceptor drum 1 as the drum rotates, and a voltage of 0 to 400 V is applied to the drum through the brush 18. When the voltage is applied thus, developing agent remaining on the drum 1 after image transfer is disordered so at to be rendered unreadable or nonpatterned, the residual electrostatic latent image remaining on the drum 1 also being de-electrified and erased by means of the brush 18. Since the negative charge of the photoreceptor drum 1 is previously erased by means of the discharge lamp 6, the discharge by means of the brush 18 has a primary role to erase the positive charge.

Since the disordering device 7 is located above the photoreceptor drum 1, the developing agent T adhering to the elastic brush 18 can be prevented from dropping and being scattered within the apparatus. Thus, even if the developing agent T drops onto the photoreceptor drum 1, it can be transported on the drum 1 to be recovered directly by means of the developing device 4.

The photoreceptor drum 1 is underlain by a paper supplying unit 19 containing paper sheets 17 which are fed onto the paper transportation path 16 by means of a paper supplying roller 20 disposed above the paper supplying unit 19.

The transportation path 16 is provided with a fixing device 21 for fixing the transferred toner image to a paper sheet 17.

The following is a description of the operation of the recording apparatus described above.

The photoreceptor drum 1 is rotated in the direction indicated by arrow A, and its peripheral surface is charged to about −500 to −800 V by means of the charger 2. Subsequently, the laser beam 8 from the laser device 3 is applied to the charged region, thereby forming an electrostatic latent image on the surface of the photoreceptor drum 1. Then, the latent image is transported to a cleaning position where it faces the developing and cleaning device 4.

The developing agent (toner) T is supplied by means of the developing roller 10 arranged within the developing and cleaning device 4, is caused to adhere to the electrostatic latent image on the surface of the photoreceptor drum 1, the developing roller 10 being at this time, pressed against the drum 1, so that the drum undergoes elastic deformation. As a result, the roller 10 comes into contact with the drum 1 with a predetermined nip width, whereby the toner T is caused to adhere to the latent image, thereby forming a toner image. Specifically, the toner T adheres to that portion of the photoreceptor drum 1 exposed to the laser beam 8, thus subjecting the latent image to the so-called reverse development.

The average particle size of the toner T used may range from 8 to 15 $\mu$m. The toner T is charged to about −5 to −30 $\mu$c/g by friction between the blade 23 and the surface layer 10c of the developing roller 10, and a voltage of about −200 to −450 V is applied to the roller 10.

The developed toner image is then transported to a transfer region where it faces the transfer roller 5. Meanwhile, as the paper supplying roller 20 rotates, the paper sheet 17 is fed from the paper supplying unit 19 in synchronism with the rotation of the photoreceptor drum 1.

When the paper sheet 17 comes into contact with the transfer roller 5, its back surface is positively charged. Accordingly, the toner image on the surface of the photoreceptor drum 1 is electrostatically attracted and transferred to the sheet 17. In this case, a voltage of 1,000 to 2,000 V from a DC power source 23 is applied to the transfer roller 5 via its rotating shaft. This voltage is applied to the conductive surface layer 10c having a resistance of $10^5$ to $10^9$ $\Omega \cdot$ cm through the conducting part. To facilitate the cleaning or the removal of the adhering toner, paper dust, or other foreign matter, the surface of the transfer roller 5 should preferably be formed of a material which enjoys smoothness and low friction characteristic. In this embodiment, conductive fluoropolymer or conductive polyester is used as the material of the conductive surface layer 10c, whose surface can be easily cleaned by means of a cleaning blade 22. The rubber hardness of the whole transfer roller 5 preferably ranges from 25 to 50, as measured according a method provided by the Japanese Industrial Standards. With use of such a soft material, the allowance for the force of pressure of the transfer roller 5 of the photoreceptor drum 1 is good enough for a satisfactory result.

Figure 4:
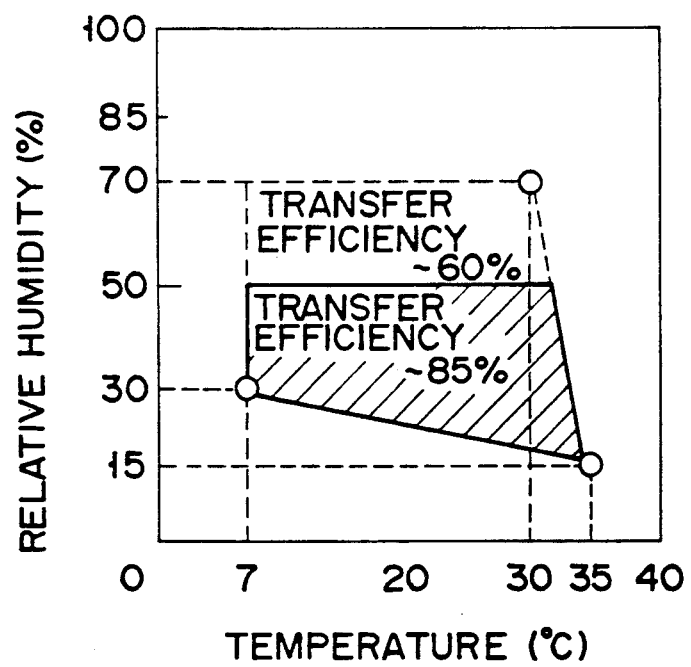
FIG. 4 is a diagram showing the range wherein satisfactory transfer efficiency is obtained by use of a conventional transfer charger operating on the principle of corona discharge.

In FIG. 3, the hatched region represents the range of satisfactory transfer efficiency (operating environment) obtained with use of the transfer roller 5. Likewise, the hatched region of FIG. 4 represents the range of satisfactory transfer efficiency (operating environment) obtained with use of a conventional transfer charger based on corona discharge. As seen from FIGS. 3 and 4, a transfer efficiency of 85% or more when the transfer roller 5 (FIG. 3) is used, while it can be obtained at the relative humidity of 30 to 50% according to the method using the transfer charger. Thus, according to the conventional method, even if a allowable level of a transfer efficiency is lowered to 60%, the relative humidity only spreads to 30 to 70%, indicating that the maximum tolerance of the relative humidity can be increased to 70% at the most.

For the recording apparatus having no cleaning device, the above circumstances indicate that the post-transfer residual toner increases at high humidity, thus constituting the most significant cause of defective cleaning of the conventional cleanerless recording apparatus.

Using the contact-type transfer system employing the elastic conductive transfer roller 5, the recording apparatus according to the aforementioned embodiment can efficiently non-patterning the residual toner after the transfer throughout a wide range of environment. Since the transfer roller 5 is directly in contact with the paper sheet 17 during the transfer, moreover, paper dust sticking to the sheet 17 can be efficiently removed by attraction by means of the roller 5. Accordingly, very little extraneous matter remains on the photoreceptor drum 1 after the transfer.

Since the paper sheet 17 is pressed by the transfer roller 5, transfer errors (partial omission) can be prevented, and a distinct transfer image can be obtained without being affected by the size or quality of the sheet 17.

After the transfer, the paper sheet 17 is delivered to the fixing device 21, whereupon the toner is fused and fixed to the sheet 17. Then, the sheet 17 is discharged.

After the transfer process, a residual toner image or a positive o negative residual electrostatic latent image barely remains on the surface of the photoreceptor drum 1. Though not essentially required, the negative latent image is first erased by means of the discharge lamp 6. Next, the residual toner reaches the location of the disordering device 7 as the drum 1 rotates, whereupon it is rendered nonpatterned by the device 7.

In the disordering device 7, the elastic brush 18 is brought into contact with the photoreceptor drum 1, and the residual electrostatic latent image and toner image are disordered by means of mechanical and electrostatic forces, thereby creating an unreadable state. In this case, the friction charging polarity of the material of the elastic brush 18 is made identical with that of the toner, so that a repulsive force is produced in the toner. Thus, the residual toner on the photoreceptor drum 1 cannot be attracted to the brush 18, that is, the toner is prevented from accumulating on the brush. If a conductive material is used for the elastic brush 18, a repulsive force is produced between the brush 18 and the toner by applying a potential of the same polarity as the toner or ground potential to the brush. Thus, the toner is prevented from accumulating on the brush 18.

The residual toner on the photoreceptor drum 1 is disordered in this manner. The disordered residual toner scatters on the surface of the drum 1 and lightly adheres to the surface without being seized by the elastic brush 18. The disordering device 7 does not serve as a cleaning device, but has an only auxiliary function for cleaning. The toner particles scattered on the surface of the photoreceptor drum 1 are distributed in too small dots to form characters or an image.

The disordered region of the photoreceptor drum 1 is then transported to a charging position where it faces the charger 2, and charged by corona discharge. After the charging, the drum 1 is exposed by means of the laser device 3 to form an electrostatic latent image thereon, which then reaches again the developing and cleaning position where it faces the developing and cleaning device 4.

In the electrostatic latent image, the residual toner is spread uniformly and thin enough both in an exposed portion, to which the toner is expected to adhere, and in a non-exposed portion, so that there is no possibility of irregular exposure. Thus, the residual potential after exposure is uniform, so that a uniform toner image can be obtained even in a second cycle of development.

As described above, the developing roller 10 has a hardness of 30 to 70 (based on the JIS rubber hardness measurement method) and a low resistance of $10^2$ to $10^8$ $\Omega \cdot cm$. If a linear load of 20 to 150 g/cm is applied to the developing roller 10, and if the roller 10 is brought into sliding contact with the photoreceptor drum 1 at a peripheral speed 1.5 to 4 times as high as the peripheral speed of the drum 1, a contact width (nip width) of 1 to 4 mm is formed. When the residual toner and the toner T on the developing roller 10 are in sliding contact at the nip portion, a great frictional force is produced between them, whereby the cleaning capacity can be increased. If the developing agent is formed of the toner T only, reduction of image quality, such as streaks, cannot be caused.

In the non-exposed portion, moreover, the force of attraction by the developing bias is greater than that of the photoreceptor drum 1, so that the toner T adhering to the drum 1 is attracted to the developing and cleaning device 4 and recovered. Thus, new toner particles from the developing roller 10 are caused to adhere to the exposed portion by supplying the roller 10 with the developing bias of a proper value intermediate between the residual potential of the exposed portion and the potential of the non-exposed portion. At the same time, the residual toner on the non-exposed portion is attracted to the developing roller 10 and recovered. In this case, the residual toner is in a small quantity, and is scattered in small dots by the disordering device 7, so that it can be efficiently recovered by means of the disordering and charging device 2. Thus, one toner image ca be obtained by repeatedly rotating the photoreceptor drum 1. After the developing and cleaning, the toner image is transferred to the paper sheet 17 at the position where it faces the transfer roller 5. Thereafter, the same processes of operation are repeated.

According to the recording apparatus of the embodiment described above, the memory image, which has conventionally been produced, can be eliminated, and defective cleaning can be prevented, despite the use of the photoreceptor drum 1 with a short diameter. When 20,000 copies were taken using an image area of about 7% and size-A4 paper sheets, they all were able to enjoy satisfactory images without entailing defective cleaning.

If a bias voltage is applied to the disordering device 7, moreover, it can be adjusted so that the toner is effectively disordered, and the recovery of the toner is positively prevented. Thus, the disordering device 7 can be prevented from being contaminated. In this case, the toner adhering to the disordering device 7 can be forced out onto the surface of the photoreceptor drum 1 by applying a voltage of, for example, about 100 to 300 V to the elastic brush 18 during non-operation, that is, while the non-image region is passing the device 7. The discharged toner is transported to the developing and cleaning device 4 to be recovered thereby. In this case, moreover, a voltage of 0 to 100 V is applied to the developing roller 10 without operating the charger 2 in order to prevent the photoreceptor drum 1 from being charged.

The toner can be prevented from accumulating in the disordering device 7 by an alternative method. According to this method, a charging region for attracting the toner adhering to the device 7 is formed in the non-image region on the photoreceptor drum 1. In this case, the drum 1 is charged to the polarity opposite to that of the electrostatic latent image by means of the transfer roller 5. This can be easily done in a reverse development system.

The cleanerless developing system according to the present invention produces a particularly good cleaning effect with use of a one-component developing agent Referring to FIGS. 5 and 6, this effect will be described.

Figure 5:
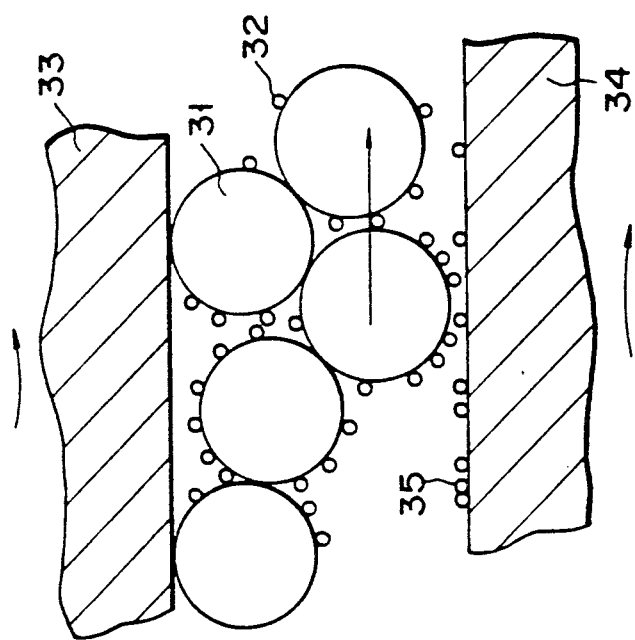
FIG. 5 is a schematic view showing the cleaning effect obtained by using a two-component magnetic brush to clean residual toner off a photoreceptor drum.

FIG. 5 is a schematic view for illustrating the cleaning effect of the residual toner on the photoreceptor drum obtained with use of a two-component magnetic brush. FIG. 6 is a schematic view for illustrating the cleaning effect of the residual toner on the photoreceptor drum obtained with use of the contact-type one-component system or the one-component developing and cleaning device according to the present invention.

In FIG. 5, the developing agent is a two-component developing agent which is formed of a carrier 31 and a toner 32. The carrier 31 is composed of ferrite or iron oxide particles with a diameter of 80 to 150 μm. As a magnetic roller 33 rotates, the carrier 31 is brought into sliding contact with residual toner particles 35 on a photoreceptor drum 34. In this case, the particles of the carrier 31 is much bigger than the toner particles whose diameter is about 10 μm. In a dense state, therefore, the carrier 31 cannot be easily brought into contact with the residual toner particles 35, that is, the probability of contact is low, so that the residual toner particles 35 cannot be mechanically swept away with high efficiency.

Figure 6:
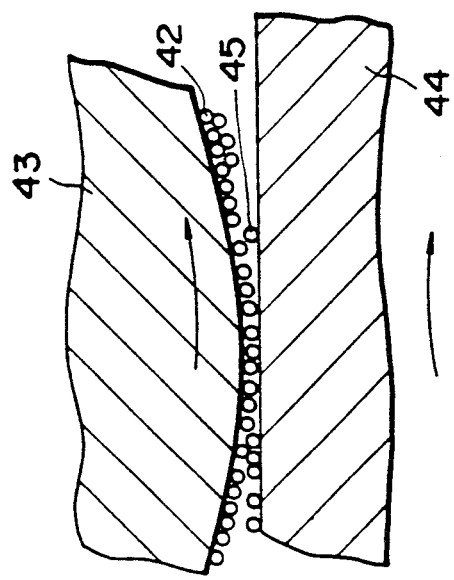
FIG. 6 is a schematic view showing the cleaning effect obtained by using a contact-type one-component system according to the present invention to clean residual toner off a photoreceptor drum.

In the contact-type one-component system shown in FIG. 6, on the other hand, the developing agent is composed of a toner 42 only, and contains no carrier. Therefore, the toner 42 on an elastic developing roller 43 is directly pressed against residual toner particles 45 on a photoreceptor drum 44 for sliding contact. In this case, the particles of the same size are in sliding contact with one another, so that the probability of contact between residual toners and developing toners is very high. Accordingly, the mechanical sweeping capability is high, so that a satisfactory cleaning effect can be obtained. Since the particles in sliding contact are as small as 10 μm in diameter, moreover, streaky image noises, which is frequently generated in the above tow component system, cannot be caused.

Although the transfer roller 5 is used as the contact-type transfer means in the device according to the embodiment shown in FIG. 1, it may be replaced by a transfer belt. In the above embodiment, moreover, the conductive elastic roller is used as the transfer roller 5. Alternatively, however, an insulating elastic roller or a corona transfer means including a belt may be used for the purpose.

Further, a roller-shaped rotating brush of the same material as the elastic brush 18 of the disordering device 7 may alternatively be used as the transfer roller. In this case, the rotating brush is shaped like the transfer roller 5, and the same applied voltage and force of pressure are used. The toner adhering to the rotating brush can be removed by means of a rotating electrode to which is applied a voltage of the polarity opposite to that of the voltage applied to the brush.

As described above, the recording apparatus according to the present invention employs the elastic developing member, which is pressed against the electrostatic latent image on the image carrying body for sliding contact with a relative speed difference. Thus, a great frictional force can be produced between the elastic developing member and the residual developing agent to improve the cleaning efficiency.

Further, the reverse development is used, and the image carrying body and the developing agent are charged to the same polarity, so that the adhesion of the developing agent to the image carrying body can be weakened, and the cleaning efficiency for the residual developing agent can be improved. Furthermore, the use of the contact-type transfer means results in an improvement in transfer efficiency.

Additional advantages and modifications will readily occur to those skilled in the art. Therefore, the invention in its broader aspects is not limited to the specific details, representative devices, and illustrated examples shown and described herein. Accordingly, various modifications may by without departing from the spirit or scope of the general inventive concept as defined by the appended claims and their equivalents.

What is claimed is:

1. An image forming apparatus comprising:
   means for forming a latent image on an image carrying body;
   a roller comprising an elastic and a conductive layer for carrying a one-component developing agent to the image carrying body and for removing a residual developing agent from the image carrying body.
   means for rotating the elastic and conductive roller at a predetermined peripheral speed faster than a peripheral speed of the image carrying body so that the elastic and conductive roller is in slidable contact with the image carrying body with a predetermined contact width,
   means for applying a linear load in a range of 20 to 150 g/cm to the elastic and conductive roller so as to produce a frictional force between the one-component developing agent and the residual developing agent to thereby enhance cleaning of the residual developing agent from the image carrying body;
   means for transferring the developed latent image on the image carrying body to a recording medium; and
   means for disordering the developing agent remaining on the image carrying body after transfer of the developed latent image by the transferring means, so as to disorder any pattern therein.

2. An image forming apparatus as cited in claim 1 wherein said means for rotating operates to rotate said roller at a predetermined peripheral speed which is 1.5 to 4 times greater than the peripheral speed of the image carrying body.

3. An image forming apparatus as recited in claim 2 wherein the predetermined contact width is in a range of 1 to 4 mm.

4. An image forming apparatus as recited in claim 1 wherein the predetermined contact width is in a range of 1 to 4 mm.

5. An image forming apparatus as recited in claim 1 further comprising means for applying a biasing voltage to said roller.

6. The image forming apparatus according to claim 1, wherein said roller comprises a developing roller including a metal shaft, said elastic layer surrounding the metal shaft, and a conductive surface layer formed on a surface of the elastic layer.

7. The image forming apparatus according to claim 6, wherein said elastic layer has polyurethane foam, and said conductive surface layer has a mixture of polyurethane resin and 10 to 30% by weight of conductive carbon.

8. The image forming apparatus according to claim 7, wherein said conductive surface layer has an electric resistance ranging from $10^2$ to $10^9$ $\Omega \cdot$ cm.

9. The image forming apparatus according to claim 7, further comprising an elastic blade in sliding contact with the roller.

10. The image forming apparatus according to claim 7, wherein said development performed by the image forming apparatus is reverse development wherein the developing agent adheres to said latent image on an exposed portion of said image carrying body.

11. The image forming apparatus according to claim 1, wherein said developing agent on said roller is charged to a same polarity as the electrostatic latent image.

12. The image forming apparatus according to claim 1, wherein said transferring means includes a transfer roller.

13. An image forming apparatus as recited in claim 1 wherein the latent image forming means comprises:
   a charger for charging said image carrying body; and
   an exposure station for exposing said image carrying body to an image to be developed to thereby form said latent image; and
   wherein said disordering means is positioned between said transferring means and said charger.

14. An image forming apparatus comprising:
   means for forming a latent image on an image carrying body;
   an integrated developing/cleaning roller for developing the latent image with a one-component developing agent and for simultaneously removing residual developing agent remaining on the image carrying body therefrom while the latent image is developed, the developing/cleaning roller having an elastic and a conductive layer for carrying the one-component developing agent to an exposed portion of an image carrying body and for simultaneously removing residual developing agent from the same exposed portion of the image carrying body;
   means for rotating the developing/cleaning roller at a predetermined peripheral speed faster than a peripheral speed of the image carrying body so that the developing/cleaning roller is in slidable contact with the image carrying body with a predetermined contact width;
   means for applying a linear load to the developing/cleaning roller so as to produce a frictional force between the one-component developing agent and the residual developing agent to thereby enhance cleaning of the residual developing agent from the image carrying body;
   means for transferring the developed latent image on the image carrying body to a recording medium by bringing the recording medium into pressure-contact with the image carrying body, the transfer means having an elastic and a conductive layer to which a transfer bias voltage is applied; and means for disordering the developing agent remaining on the image carrying body after transfer of the developed latent image by the transferring means, so as to render the remaining developing agent unreadable or nonpatterned, the disordering means having a conductive elastic member which is brought into sliding contact with the image carrying body wherein the remaining developing agent on the image carrying body is disordered by means of mechanical and electrostatic forces.

15. An image forming apparatus as recited in claim 14 wherein the latent image forming means comprises:
   a charger for charging said image carrying body; and
   an exposure station for exposing said image carrying body to an image to be developed to thereby form said latent image; and
   wherein said disordering means is positioned between said transferring means and said charger.

16. An image forming apparatus as recited in claim 15 wherein said linear load is in a range of 20 to 150 g/cm.

17. An image forming apparatus as recited in claim 14 wherein said linear load is in a range of 20 to 150 g/cm.

* * * * *